(12) United States Patent
Kitamura et al.

(10) Patent No.: US 6,832,633 B2
(45) Date of Patent: Dec. 21, 2004

(54) HIGH DENSITY FABRIC FOR AIR BAG AND METHOD FOR MANUFACTURING HIGH DENSITY FABRIC

(75) Inventors: Mamoru Kitamura, Ohtsu (JP); Kaoru Ban, Ohtsu (JP)

(73) Assignee: Toyo Boseki Kabushiki Kaisha, Osaka (JP)

( * ) Notice: Subject to any disclaimer, the term of this patent is extended or adjusted under 35 U.S.C. 154(b) by 147 days.

(21) Appl. No.: 10/044,233

(22) Filed: Jan. 11, 2002

(65) Prior Publication Data

US 2002/0155774 A1 Oct. 24, 2002

(30) Foreign Application Priority Data

Jan. 17, 2001 (JP) ........................................ 2001-008958
Apr. 19, 2001 (JP) ........................................ 2001-121435

(51) Int. Cl.[7] ............................................... D03D 3/00
(52) U.S. Cl. ................. 139/384 R; 428/34.1; 428/34.3; 428/34.5; 428/34.6; 428/34.7; 428/35.7; 428/36.1; 428/36.2; 428/102; 428/103; 428/104; 428/105; 428/107; 280/728.1; 280/728.3; 280/729; 280/730; 280/730.2; 139/420; 139/408; 139/409; 139/410; 139/411; 139/412; 139/413; 139/414; 139/415; 139/416; 139/417; 139/418; 139/419; 139/421; 139/422; 139/423

(58) Field of Search .................. 428/34.1, 34.3, 428/34.5, 34.6, 34.7, 35.7, 36.1, 36.2, 102–105, 10; 280/728.1, 728.3, 729, 730, 730.2; 139/384 R, 420, 408–419, 421–423

(56) References Cited

U.S. PATENT DOCUMENTS

| | | | | |
|---|---|---|---|---|
| 5,441,798 A | * | 8/1995 | Nishimura et al. | .......... 442/205 |
| 6,024,380 A | * | 2/2000 | Kim et al. | ............... 280/743.1 |
| 6,135,161 A | * | 10/2000 | Nakano et al. | ............ 139/55.1 |
| 6,328,334 B1 | * | 12/2001 | Kanuma | .................. 280/730.2 |
| 6,455,449 B1 | * | 9/2002 | Veiga et al. | ................ 442/218 |

FOREIGN PATENT DOCUMENTS

JP          4 193646          7/1992

\* cited by examiner

*Primary Examiner*—Arti R. Singh
(74) *Attorney, Agent, or Firm*—Leydig, Voit & Mayer, Ltd.

(57) ABSTRACT

There is provided a high density woven fabric wherein air permeability under 50 kPa differential pressure is 2.5 L/cm$^2$/min. or less, and air permeability index (50 kPa) calculated by the formula 1 is 1.2 or more.

Air permeability index (50 kPa)=(Log ($Q$ (55 kPa))–
   Log ($Q$ (45 kPa)))/(Log 55–Log 45)          (Formula 1)

Air permeability under $Q$(55 kPa):55 kPa differential pressure is (1/cm$^2$/min.); and Air permeability under $Q$(45 kPa):45 kPa differential pressure is (1/cm$^2$/min.).

13 Claims, No Drawings

HIGH DENSITY FABRIC FOR AIR BAG AND METHOD FOR MANUFACTURING HIGH DENSITY FABRIC

BACKGROUND OF THE INVENTION

1. Field of the Invention

The present invention relates to a high density fabric for air bag and method for manufacturing high density fabric which is suitable for a fabric of air bag, one of safety apparatuses of automobile, and more specifically to a high density fabric for air bag having low air permeability, as well as excellent air permeability characteristics under high pressures while maintaining necessary mechanical properties.

2. Description of the Related Art

In recent years, the number of automobiles equipped with an air bag as a car safety component has rapidly increased in association with rising awareness of safety of passengers. An air bag is useful for protecting a passenger at the time of collision accident of automobile by sensing the collision with a sensor and causing an inflator to generate gas of high temperature and pressure to allow the air bag to rapidly expand.

Conventionally, base fabrics on which synthetic rubber such as chloroprene, chlorosulfonated olefin, silicone have been used for the purpose of achieving heat resistance, air insulation (permeability) and flame resistance.

However, such coated base fabrics had many drawbacks when used as a base fabric for air bag. That is, the weight of base fabric increases, the softness is deteriorated, the production cost increases and recycling is difficult. Though some of silicone-coated base fabrics currently used have considerably improved the above-mentioned drawbacks, they are not still satisfactory.

For this reason, non-coated base fabrics for air bag on which coating is not made are latest mainstream, and various proposals have been made for achieving reduced weight, desirable storability and lower air permeability. Under such current circumstances, base fabrics of further reduced weight and lower air permeability are requested as non-coated air bag base fabric.

Furthermore, in case of weaving high density fabric, when the weaving speed is increased in an attempt to increase productivity, yarn damages are increased due to frictions between the fibers and with reed, with the result that problems occur such as to give undesirable effects to the physical properties of the foundation. There is strong desire to obtain measures for settling these points.

SUMMARY OF THE INVENTION

It is an object of the present invention to provide a high density fabric suitable for air bag and method for manufacturing high density fabric, by obtaining a fabric of low air permeability and reduced weight having a stable fabric strength mechanical property and excellent air permeability characteristics under high pressures that has not been solved by the above-mentioned conventional methods.

Means for solving the above object, that is, the first aspect of the present invention is a high density fabric for air bag wherein air permeability under a differential pressure of 50 kPa is 2.5 L/cm²/min. or less, and air permeability index (50 kPa) calculated by the formula (1) is 1.2 or more.

$$\text{Air permeability index (50 kPa)} = (\text{Log}(Q(55\text{ kPa})) - \text{Log}(Q(45\text{ kPa})))/(\text{Log}55 - \text{Log}45) \quad (1)$$

$Q$(55 kPa): air permeability under 55 kPa differential pressure (1/cm²/min.)

$Q$(45 kpa): air permeability under 45 kPa differential pressure (1/cm²/min.)

The second aspect of the invention is the high density fabric for air bag according to the first aspect, wherein the air permeability (50 kPa) is 1.3 or more, the third aspect of the invention is the high density fabric for air bag according to the first aspect, wherein the difference in crimp percentage between warp and weft is 4% or more, the fourth aspect of the invention is the high density fabric for air bag according to the first aspect, wherein the degree of intermingle of raw yarn before weaving is 10 to 30 times/m, and the fifth aspect of the invention is the high density fabric for air bag according to the first aspect, where in a cover factor calculated by the formula (2) in the high density fabric is in the range of 1800 to 2400.

$$\text{Cover factor} = A^{0.5} \times (W1) + B^{0.5} \times (W2) \ldots \quad \text{(Formula 2)}$$

A: Coarseness of warp (dtex)
B: Coarseness of weft (dtex)
W1: Density of warp (stripes/in.)
W2: Density of weft (stripes/in.)

The sixth aspect of the invention is the high density fabric for air bag according to the first aspect, wherein the degree of intermingle of warp or weft of the high density fabric is 8 times/m or less.

Now, characterizations of the high density fabric suitable for air bag according to the present invention will be explained in detail. The difference in crimp percentage between warp and weft constituting the fabric is preferably 4% or more, more preferably 5% or more, and most preferably 6% or more. The difference in crimp percentage of less than 4% is not desirable because the air permeability under high pressures cannot be made large. The degree of intermingle of unwoven yarn (yarn taken out from woven fabric) in warp and/or weft is preferably 8 times/m or less, and more preferably 6 times/m or less. The degree of intermingles of unwoven yarn higher than 8 times/m is not desirable because the air permeability is high.

The air permeability under 50 kPa differential pressure in the present invention is 2.5 L/cm²/min. or less, preferably 2 L/cm²/min. or less, and most preferably 1.5 L/cm²/min. or less. If the air permeability under 50 kPa differential pressure exceeds 2.5 L/cm²/min., the mechanical property in the expanded state is not satisfactory.

The air permeability index under 50 kPa differential pressure in the present invention is preferably 1.2 or more, more preferably 1.3 or more, and most preferably 1.5 or more, with 1.8 or more being particularly preferred. The air permeability index of less than 1.2 is not desirable because collision to the passenger under high pressures at the time of expansion of the air bag is not sufficiently reduced.

The degree of intermingle of raw yarn is preferably 10 to 30 times/m, and more preferably 15 to 25 times/m. The degree of intermingle of less than 10 times/m is not desirable because fluff will generate to deteriorate the weaving efficiency and drawbacks due to the fluff increase to deteriorate the quality. On the other hand, the degree of intermingle of more than 30 times/m is not desirable because the remaining degree of intermingle of yarns constituting the fabric after weaving is large, so that low air permeability cannot be obtained, causing decrease of the strength.

The cover factor in the present invention is preferably 1800 to 2400, and more preferably 1900 to 2300. The cover factor of less than 1800 is not desirable because low air permeability cannot be obtained. The cover factor of more than 2400 is not desirable because troubles at the time of weaving increase to deteriorate the productivity.

It is necessary that the shrinkage percentage by boiling water of the thermoplastic fiber used in the present invention is 5 to 15%. If the shrinkage percentage by boiling water is less than 5%, low air permeability cannot be obtained, while on the other hand, if the shrinkage percentage by boiling water is more than 15%, the thickness of fabric after shrinkage is large, so that the compactness will be lost.

While the value of the shrinkage percentage by boiling water is preferably 5 to 15%, 8 to 12% is more preferred. While the temperature of heat treatment in the present invention is not particularly specified, heat treatment is usually performed at 100 to 200° C. It is preferred that heat treatment is performed at 160° C. or less from the viewpoint of achieving low air permeability. While the treatment is performed by heat setter, boiling water bath and the like not specified means, it is possible to use a processing machine enabling about 0 to 15% of over feed in the vertical and horizontal directions. The over feed at the time of boiling water treatment is more than 3 times, more preferably 5 times, and most preferably 10 times the over feed at the time of dry setting. In the boiling water treatment, it is not necessarily to use boiling water, hot water of 70 to 100° C. can also be used. Incidentally, the over feed percentage at the time of boiling water treatment is 3 to 8%, and preferably 4 to 6%. The over feed percentage of less than 3% is not desirable because it is difficult to obtain a fabric of low air permeability. On the other hand, the over feed percentage of more than 8% is not desirable, because the base fabric cannot fully shrink and cause troubles in treatment process.

While the way of weaving is not particularly limited, plain weave is preferred in consideration of the uniformity of the mechanical property of the base fabric, and various weaving machines such as air jet loom, rapier loom, water jet loom and the like can be used without any limitation.

As for the thermoplastic fiber constituting the air bag in the present invention, while the materialis not particularly limited, aliphatic polyamide fiber such as nylon 6, nylon 66, nylon 46 and nylon 12, or homopolyester such as polyethylene terephthalate and polybutylene terephthalate is used without being particularly limited. However, in consideration of the economics and collision resistance, nylon 66, nylon 46, nylon 6 are particularly preferred. Furthermore, various additives may be contained or added in these synthetic fibers without causing any problems for the purpose of improving the process passing ability of the process of producing raw yarns and the post-treatment process. Such additives include, for example, antioxidant, thermostabilizer, smoothing agent, antistatic agent, flame retardant and the like.

Furthermore, general fineness and single yarn fineness of raw yarn to be used are preferably in the range of 100 to 550 dtex and 6 dtex or less, respectively. Preferably, the general fineness is in the range of 150 dtex to 470 dtex, and the single yarn fineness is 4.4 dtex or less. More preferably, the general fineness is in the range of 200 dtex to 400 dtex, and the single yarn fineness is 3.3 dtex or less. That is, if the general fineness is less than 100 dtex, the tensile strength and the tearing strength are not satisfactory in that part, while if the general fineness is more than 550 dtex, the softness of the fabric is deteriorated and storability is poor. If the single yarn fineness is more than 6 dtex, the softness of the fabric is deteriorated and storability is poor.

The characteristic constitution of the high density fabric manufacturing method according to the present invention is to carry out weaving fabric with the fiber filling percentage in the reed at the time of the weaving defined by the following formula to be 110 or less.

$$\text{Fiber filling percentage (\%)}=11.3 \times N \times (D/\rho)^{0.5}/(\alpha/L)$$

N: Number of yarns to be inserted in a reed wire
D: Coarseness of warp (dtex)
$\rho$: Density of fiber (g/cm$^3$)
$\alpha$: Reed space percentage (%)
L: Number of reed wires (string/cm)

According to this constitution, it has been possible to provide a method for manufacturing high density fabric the physical property foundation with preservation of the foundation physical properties necessary as a fabric for air bag and capable of improving productive efficiency.

The fiber filling percentage in the reed is preferably 100, more preferably 90 or less, and further preferably 80 or less.

Further, it is preferable for the cover factor of the high density fabric to be defined by the following formula to be in the range of 2,000–2,500.

$$\text{Cover factor}=A^{0.5} \times (W1)+B^{0.5} \times (W2)$$

A: Coarseness of warp (dtex)
B: Coarseness of weft (dtex)
W1: Density of warp (stripes/in.)
W2: Density of weft (stripes/in.)

The fiber filling percentage is based on the definition of the filling percentage in the width direction at the time when the fibers are arrayed in the width direction in the reed wires to assume the cross section of the multifilament to be circular. When fiber stripes are densely filled in the space between the reed wires, friction between the fibers become large to make the single yarn of the multifilament more apt to be damaged. Further, when weaving speed is increased, damages of multifilament yarns are enlarged, or coiling between the single yarns becomes strong to cause degradation of physical properties of foundation. In this case, by controlling the fiber filling percentage, damages during weaving are reduced, and production efficiency can be increased by decreasing the frequencies of machine stoppages by single yarn breakages and the like.

The fiber filling percentage is necessarily made to 110% or less, more preferably 100% or less, and further preferably to 90% or less. In weaving a high density fabric, there are many cases where the weaving density is increased, and weaving is conducted at a fiber filling percentage of more than 110% under no control. In order to reduce the fiber filling percentage, the space percentage of the reed wires is a problematic matter.

The space percentage of the reed wires is preferably in the range of 45% or more and less than 70%, and more preferably more than 50% and less than 65%. When the space percentage of the reed wires becomes less than 45%, the fiber filling percentage in the high density fiber becomes large to cause damages to the warp fibers, and machine stoppage frequency by trouble increases in weaving due to fluff formation. In addition, foundation strength is also lowered to give undesirable results. When the space percentage of reed is made larger than 70%, damages of weft are enlarged by input in reed to cause lowering of foundation strength and undesirable results occur. When the weaving speed is enlarged, the machine stoppage frequency is also increased, and optimization of fiber filling percentage is necessitated. The increase in the machine stoppage frequencies gives susceptibility to have effects as the coarseness of single yarn becomes smaller.

The yarn to be used for the present invention is preferably substantially non-twist or soft twist, and especially more preferably the use of the non-twist one. This is because, in case of an attempt to obtain low air permeable fiber by using the low single yarn fineness yarn, if twist is given, spreading of single yarn is inhibited to make it difficult to obtain low air permeability.

DETAILED DESCRIPTION OF THE PREFERRED EMBODIMENT

The present invention will be further described by way of the following examples. The physical properties in the examples were measured in the following manners.

Crimp percentage: JIS(Japan Industrial Standard) L1096 6.7 B Method

Degree of intermingle: degrees of intermingle of raw yarn and unwoven yarn are measured by measuring a distance between intermingles from the displacement of the needle using a thread to which a load (formula 2) is applied and calculating the number of intermingle included in 1 meter.

$$\text{Load (g)} = 0.045 \times \text{fineness of multifilament (dtex)} \qquad (2)$$

Shrinkage percentage by boiling water: JISL1013 shrinkage percent by hot water B method, 100° C.

Weaving density: JIS L1096 6.6

Tensile Strength and Elongation: JIS L1096 6.12 A method

Tearing strength: JIS L1096 6.15 A-1 method

EXAMPLES 1 TO 3 AND COMPARATIVE EXAMPLES 1 TO 2

After weaving raw yarns 350 dtex/108f (single yarn fineness 3.3 dtex) having physical properties as shown in Table 1 as warps and wefts by plain weaving using a water jet loom, shrinking work by boiling water is made, and dry finished at 130° C. to obtain a non-coated air bag fabric having a warp density of 60 yarns/in. and a weft density of 60 yarns/in. The evaluation results of this air bag fabric are shown in Table 1.

TABLE 1

|  |  |  | Example 1 | Example 2 | Example 3 | Comparative Example 1 | Comparative Example 2 |
|---|---|---|---|---|---|---|---|
| Fineness |  | dtex | 350 | 350 | 350 | 350 | 350 |
| Number of filament |  | yarns | 108 | 108 | 108 | 108 | 108 |
| Single yarn |  | dtex/yarns | 3.2 | 3.2 | 3.2 | 3.2 | 3.2 |
| Degree of intermingle of raw yarn | warp | Times/yarn | 19 | 19 | 19 | 31 | 19 |
|  | weft |  | 19 | 25 | 25 | 31 | 19 |
| Shrinkage percentage by boiling water | warp | % | 9.2 | 9.2 | 9.2 | 9.2 | 9.2 |
|  | weft |  | 9.2 | 9.2 | 9.2 | 9.2 | 9.2 |
| Over feed at the time of shrinkage by boiling water | warp | % | 4.5 | 5.5 | 6.5 | 2.5 | 0.0 |
|  | weft |  | 4.0 | 4.5 | 5.0 | 2.0 | 1.0 |
| Over feed at the time of dry setting | warp | % | 0.5 | 0.2 | 0.1 | 1.0 | 2.0 |
|  | weft |  | 0.5 | 0.0 | 0.1 | 0.5 | 1.0 |
| Temperature of dry setting |  | ° C. | 130 | 130 | 130 | 130 | 130 |
| Density | warp | yarns/inch | 60 | 60 | 60 | 60 | 60 |
|  | weft |  | 60 | 60 | 60 | 60 | 60 |
| Degree of intermingle of unwoven yarn | warp | times/yarn | 5.9 | 5.3 | 4.8 | 10.2 | 5.4 |
|  | weft |  | 9.5 | 11.2 | 12.1 | 12.5 | 11.0 |
| Crimp percentage | warp | % | 7.3 | 8.4 | 8.7 | 10.4 | 5.3 |
|  | weft |  | 2.3 | 2.3 | 1.9 | 1.8 | 3.5 |
| Air permeability (55 kPa) |  | 1/cm2/min | 2.42 | 2.18 | 2.60 | 3.15 | 3.95 |
| Air permeability (45 kPa) |  | 1/cm2/min | 1.82 | 1.62 | 1.80 | 2.52 | 3.10 |
| Air permeability index (50 kPa) |  |  | 1.4 | 1.5 | 1.8 | 1.1 | 1.2 |
| Cover factor |  |  | 2245 | 2245 | 2245 | 2245 | 2245 |
| Tensile Strength | warp | N/cm | 580 | 574 | 578 | 570 | 576 |
|  | weft |  | 567 | 553 | 557 | 564 | 548 |
| Elongation | warp | % | 35 | 34 | 35 | 36 | 32 |
|  | weft |  | 29 | 28 | 29 | 27 | 28 |
| Tearing strength | warp | N | 212 | 208 | 243 | 224 | 234 |
|  | weft |  | 220 | 214 | 224 | 218 | 228 |
| Air permeability (50 kPa) |  | 1/cm2/min | 2.1 | 1.9 | 2.2 | 2.8 | 3.5 |

EXAMPLE 4 TO 5 AND COMPARATIVE EXAMPLES 3 TO 5

After weaving raw yarns 350 dtex/72f (single yarn fineness 4.9 dtex) having physical properties as shown in Table 2 as warps and wefts by plain weaving using a water jet loom, shrinking work by boiling water is made, and dry finished at 150° C. to obtain a non-coated air bag fabric having a warp density of 62 yarns/in. and a weft density of 62 yarns/in. The evaluation results of this air bag fabric are shown in Table 2.

and for weft non-twisted 470 dtex/72f, boiling water shrinkage percentage=6.5% weaving was made with a reed having space percentages of 60%, 50%, 45%, 40%, and 70%, and number of reed wires=10.0 wires/cm, after which shrinkage processing was made with boiling water, and drying finishing was made at 140° C. to obtain a woven fabric for non-coat air bag having the warp density of 54 stripes/in. and weft density of 54 stripes/in. The results of the evaluation on the physical properties of the woven fabric for air bag are shown in Table 3.

TABLE 2

| | | | Example 4 | Example 5 | Comparative Example 3 | Comparative Example 4 | Comparative Example 5 |
|---|---|---|---|---|---|---|---|
| Fineness | | dtex | 350 | 350 | 350 | 350 | 350 |
| Number of filament | | yarns | 72 | 72 | 72 | 72 | 72 |
| Single yarn | | dtex/yarns | 4.9 | 4.9 | 4.9 | 4.9 | 4.9 |
| Degree of intermingle of raw yarn | warp | times/yarn | 25 | 25 | 24 | 33 | 15 |
| | weft | | 25 | 25 | 24 | 33 | 8 |
| Shrinkage percentage by boiling water | warp | % | 9.4 | 9.4 | 9.4 | 9.4 | 9.4 |
| | weft | | 9.4 | 9.4 | 9.4 | 9.4 | 9.4 |
| Over feed at the time of shrinkage by boiling water | warp | % | 4.5 | 6.0 | 3.5 | 2.0 | 3.5 |
| | weft | | 4.5 | 4.5 | 5.5 | 2.5 | 3.5 |
| Over feed at the time of dry setting | warp | % | 0.5 | 0.2 | 1.0 | 1.0 | 0.5 |
| | weft | | 0.2 | 0.2 | 0.5 | 1.0 | 0.5 |
| Temperature of dry setting | | °C. | 150 | 150 | 150 | 150 | 150 |
| Density | warp | yarns/inch | 62 | 62 | 62 | 62 | 62 |
| | weft | | 62 | 62 | 62 | 62 | 62 |
| Degree of intermingle of unwoven yarn | warp | times/yarn | 4.3 | 3.9 | 10.8 | 15.2 | 3.0 |
| | weft | | 11.5 | 8.9 | 18.5 | 21.1 | 2.2 |
| Crimp percentage | warp | % | 7.9 | 8.2 | 10.2 | 9.2 | 9.6 |
| | weft | | 3.1 | 2.4 | 4.8 | 3.2 | 2.9 |
| Air permeability (55 kPa) | | 1/cm2/min | 2.60 | 2.12 | 2.85 | 4.30 | 3.18 |
| Air permeability (45 kPa) | | 1/cm2/min | 1.95 | 1.53 | 2.32 | 3.30 | 2.52 |
| Air permeability index | | | 1.4 | 1.6 | 1.0 | 1.3 | 1.2 |
| Cover factor | | | 2320 | 2320 | 2320 | 2320 | 2320 |
| Tensile Strength | warp | N/cm | 598 | 602 | 590 | 578 | 578 |
| | weft | | 599 | 597 | 596 | 560 | 560 |
| Elongation | warp | % | 34 | 35 | 35 | 34 | 33 |
| | weft | | 29 | 29 | 29 | 28 | 28 |
| Tearing strength | warp | N | 250 | 246 | 224 | 221 | 221 |
| | weft | | 243 | 241 | 234 | 219 | 219 |
| Air permeability (50 kPa) | | 1/cm2/min | 2.3 | 1.8 | 2.6 | 3.8 | 2.8 |

According to the present invention, a fabric of low air permeability and reduced weight having a stable fabric strength and excellent air permeability characteristics under high pressures is obtained, so that it is possible to provide a high density fabric suitable for air bag.

EXAMPLE 6–EXAMPLE 9 AND COMPARATIVE EXAMPLE 6–COMPARATIVE EXAMPLE 8

Using for warp non-twisted 470 dtex/72f (single yarn fineness 6.5 dtex), boiling water shrinkage percentage 6.5%

Of the physical property measurement method, weaving density, strength and elongation were measured by the method mentioned above, and the air permeability, boiling water shrinkage percentage, and frequency of machine stoppage were measured by the following methods.

Air permeability: JIS L1096
  Boiling water shrinkage percentage: JIS L1013 Boiling water shrinkage percentage B method at 100° C.
  Machine stoppage frequency: The frequency of machine stoppage in the course of the weaving operation for 10 days was converted into 24 hours. (number of times/24 hours).

TABLE 3

| | | | Example 6 | Example 7 | Example 8 | Example 9 | Comparative Example 6 | Comparative Example 7 | Comparative Example 8 |
|---|---|---|---|---|---|---|---|---|---|
| Warp | Filament | dtex/f | 470dtex/72f | 470dtex/72f | 470dtex/72f | 470dtex/72f | 470dtex/72f | 470dtex/72f | 470dtex/72f |
| | Boiling water shrinkage percentage | % | 6.5 | 6.5 | 6.5 | 6.5 | 6.5 | 6.5 | 6.5 |
| Weft | Filament | dtex/f | 470dtex/72f | 470dtex/72f | 470dtex/72f | 470dtex/72f | 470dtex/72f | 470dtex/72f | 470dtex/72f |
| | Boiling water shrinkage percentage | % | 6.5 | 6.5 | 6.5 | 6.5 | 6.5 | 6.5 | 6.5 |
| Reed space percentage | | % | 45 | 50 | 60 | 50 | 70 | 40 | 40 |
| Number of reed wires | | reeds/cm | 10.0 | 10.0 | 10.0 | 10.0 | 10.0 | 10.0 | 10.0 |
| Number of warp inserting | | yarns/reeds | 2 | 2 | 2 | 2 | 2 | 2 | 2 |
| $\sqrt{(D/\rho)}$ | | | 20.1 | 20.1 | 20.1 | 20.1 | 20.1 | 20.1 | 20.1 |
| Fiber filling percentage | | % | 100.2 | 90.2 | 75.1 | 90.2 | 64.4 | 112.7 | 112.7 |
| Weaving speed | | times/min | 600 | 600 | 600 | 500 | 600 | 500 | 600 |
| Machine stoppage frequency | | number of times/24 hours | 12.1 | 8.3 | 4.5 | 3.1 | 4.3 | 16.2 | 39.8 |
| Density | Warp | yarns/in. | 54 | 54 | 54 | 54 | 54 | 54 | 54 |
| | Weft | yarns/in. | 54 | 54 | 54 | 54 | 54 | 54 | 54 |
| Strength | Warp | N/cm | 731 | 744 | 752 | 764 | 725 | 713 | 691 |
| | Weft | N/cm | 738 | 754 | 745 | 752 | 711 | 728 | 732 |
| Elongation | Warp | % | 34.2 | 34.6 | 32.5 | 33.6 | 32.2 | 33.4 | 33.2 |
| | Weft | % | 27.5 | 27.7 | 26.3 | 27.2 | 26.5 | 27.3 | 26.8 |
| Air permeability | | cc/cm²/sec | 0.10 | 0.09 | 0.10 | 0.11 | 0.11 | 0.10 | 0.10 |

EXAMPLE 10–EXAMPLE 13 AND COMPARATIVE EXAMPLE 9–COMPARATIVE EXAMPLE 11

Using for warp non-twist 350 dtex/108f (single yarn fineness 3.2 dtex), boiling water shrinkage percentage=9.5% one kind, and for weft non-twist non-twist 350 dtex/108f, boiling water shrinkage percentage=9.5%, weaving was made in plain weave with a reed having space percentages of 45%, 50%, 60%, 40%, and 70%, and number of reed wires=11.5 wires/cm, after which shrinkage processing was made with warming water at 90° C., and dry set finishing was made at 140° C. to obtain a woven fabric for non-coat air bag having the warp density of 63 stripes/in. and weft density of 63 stripes/in. The results of the evaluation on the physical properties of the resulting woven fabric for air bag are shown in Table 4.

TABLE 4

| | | | Example 10 | Example 11 | Example 12 | Example 13 | Comparative Example 9 | Comparative Example 10 | Comparative Example 11 |
|---|---|---|---|---|---|---|---|---|---|
| Warp | Filament | dtex/f | 350dtex/108f | 350dtex/108f | 350dtex/108f | 350dtex/108f | 350dtex/108f | 350dtex/108f | 350dtex/108f |
| | Boiling water shrinkage percentage | % | 9.5 | 9.5 | 9.5 | 9.5 | 9.5 | 9.5 | 9.5 |
| Weft | Filament | dtex/f | 350dtex/108f | 350dtex/108f | 350dtex/108f | 350dtex/108f | 350dtex/108f | 350dtex/108f | 350dtex/108f |
| | Boiling water shrinkage percentage | % | 9.5 | 9.5 | 9.5 | 9.5 | 9.5 | 9.5 | 9.5 |
| Reed space percentage | | % | 45 | 50 | 60 | 50 | 70 | 40 | 40 |
| Number of reed wires | | reeds/cm | 11.5 | 11.5 | 11.5 | 11.5 | 11.5 | 11.5 | 11.5 |
| Number of warp inserting | | yarns/reeds | 2 | 2 | 2 | 2 | 2 | 2 | 2 |
| $\sqrt{(D/\rho)}$ | | | 17.4 | 17.4 | 17.4 | 17.4 | 17.4 | 17.4 | 17.4 |
| Fiber filling pecentage | | % | 99.4 | 89.5 | 74.6 | 89.5 | 63.9 | 111.9 | 111.9 |
| Weaving speed | | times/min | 700 | 700 | 700 | 500 | 700 | 500 | 700 |
| Machine stoppage frequency | | number of times/24 hours | 16.1 | 6.5 | 3.4 | 2.5 | 3.7 | 15.7 | 43.2 |
| Density | Warp | yarns/in. | 63 | 63 | 63 | 63 | 63 | 63 | 63 |
| | Weft | yarns/in. | 63 | 63 | 63 | 63 | 63 | 63 | 63 |
| Strength | Warp | N/cm | 590 | 621 | 634 | 632 | 628 | 589 | 567 |
| | Weft | N/cm | 623 | 617 | 620 | 629 | 596 | 631 | 624 |

TABLE 4-continued

|  |  |  | Example 10 | Example 11 | Example 12 | Example 13 | Comparative Example 9 | Comparative Example 10 | Comparative Example 11 |
|---|---|---|---|---|---|---|---|---|---|
| Elongation | Warp | % | 35.1 | 35.3 | 35.8 | 35.7 | 36.3 | 35.4 | 33.8 |
|  | Weft | % | 27.3 | 27.8 | 27.7 | 27.5 | 26.9 | 27.4 | 27.2 |
| Air permeability |  | cc/cm²/sec | 0.06 | 0.07 | 0.06 | 0.06 | 0.07 | 0.07 | 0.06 |

As will be clear from Tables 3 and 4, it can be seen that the weaving method according to the present invention is suitable for producing a foundation for low air permeable air bag without causing degradation to the strength physical properties when the weaving speed is increased.

In consequence of the contrivances as above, it has become possible to provide a method for producing low air permeable high density woven fabric in good efficiency while preserving the mechanical strength necessary as the woven fabric for air bag.

What is claimed is:

1. A high density fabric for air bag obtained by shrink processing at a overfeed ratio of 0–15%, and having an air permeability under a differential pressure of 50 kPa of 2.5 L/cm²/min. or less, and an air permeability index (50 kPa) calculate by formula (1) of 1.2 or more:

Air pemeability index (50 kPa) =(Log ($Q$(55kPa))−Log($Q$(45kPa)))/(Log 55−Log 45)  (Formula 1)

$Q$(55kPa):air permeability under 55kPa differential pressure (l/cm²/min.)

$Q$(45kPa):air permeability under 45kPa differential pressure (l/cm²/min.).

2. The high density fabric for air bag according to claim 1, wherein the air permeability (50 kPa) is 1.3 or more.

3. The high density fabric for air bag according to claim 1, wherein the difference in crimp percentage between warp and weft is 4% or more.

4. The high density fabric for air bag according to claim 1, wherein the degree of intermingle of raw yarn before weaving is 10 to 30 times/m.

5. The high density fabric for air bag according to claim 1, wherein the cover factor calculated by the formula (2) in the high density fabric is in the range of 1800 to 2400:

Cover factor=$A^{0.5}$ ×($W1$)+$B^{0.5}$×($W2$)  (Formula 2)

A: Coarseness of warp (dtex)
B: Coarseness of weft (dtex)
W1: Density of warp (stripes/in.)
W2: Density of weft (stripes/in.).

6. The high density fabric for air bag according to claim 1, wherein the degree of intermingle of warp or weft of the high density fabric is 8 times/min. or less.

7. A method for manufacturing a high density woven fabric comprising the step of weaving a high density woven fabric with a fiber filling percentage in the reed at the time of the weaving defined by the following formula (3) to be 110 or less:

Fiber filing percentage (%)=11.3×$N$×$(D/\rho)^{0.5}$ /(α/L)  (Formula 3)

N: Number of yarns to be inserted in a reed wire
D: Coarseness of warp (dtex)
ρ: Density of fiber (g/cm³)
α: Reed space percentage (%)
L: Number of reed wires (string/cm).

8. The method for manufacturing a high density woven fabric according to claim 7, wherein the fiber filling percentage in the reed is 100.

9. The method for manufacturing a high density woven fabric according to claim 7, wherein the fiber filling percentage in the reed is 90 or less.

10. The method for manufacturing a high density woven fabric according to claim 7, wherein the fiber filling percentage in the reed is 80 or less.

11. The method for manufacturing a high density woven fabric according to claim 7, wherein the high density woven fabric has a cover factor as defined by the following formula (2) in the range of 2000 to 2500:

Cover factor=$A^{0.5}$ ×($W1$)+$B^{0.5}$ ×($W2$)  (Formula 2)

A: Coarseness of warp (dtex)
B: Coarseness of weft (dtex)
W1: Density of warp (stripes/in.)
W2: Density of weft (stripes/in.).

12. The method for manufacturing a high density woven fabric according to claim 7, wherein the space percentage of the reed wires is preferably in the range between 45% and 70%.

13. The method for manufacturing a high density woven fabric according to claim 7, wherein the yarn before weaving is non-twist.

* * * * *